US012773912B2

(12) United States Patent
Nagatomi

(10) Patent No.: US 12,773,912 B2
(45) Date of Patent: Oct. 27, 2026

(54) ELECTRIC WORK VEHICLE

(71) Applicant: Kubota Corporation, Osaka (JP)

(72) Inventor: Tatsuya Nagatomi, Sakai (JP)

(73) Assignee: Kubota Corporation, Osaka (JP)

( * ) Notice: Subject to any disclaimer, the term of this patent is extended or adjusted under 35 U.S.C. 154(b) by 343 days.

(21) Appl. No.: 18/373,574

(22) Filed: Sep. 27, 2023

(65) Prior Publication Data

US 2024/0157813 A1 May 16, 2024

(30) Foreign Application Priority Data

Nov. 11, 2022 (JP) ................................ 2022-181172

(51) Int. Cl.

| | |
|---|---|
| ***B60L 15/20*** | (2006.01) |
| ***F16H 59/04*** | (2006.01) |
| ***F16H 59/10*** | (2006.01) |
| ***F16H 61/02*** | (2006.01) |
| *F16H 59/02* | (2006.01) |

(52) U.S. Cl.

CPC ........ *B60L 15/2054* (2013.01); *F16H 59/044* (2013.01); *F16H 59/105* (2013.01); *F16H 61/0248* (2013.01); *F16H 2059/026* (2013.01)

(58) Field of Classification Search

CPC .. B60L 15/2054; F16H 59/044; F16H 59/105; F16H 61/0248; F16H 2059/026; F16H 63/50; B60K 1/00; B60K 20/02; B60Y 2200/141; B60Y 2200/91

See application file for complete search history.

(56) References Cited

U.S. PATENT DOCUMENTS 4,438,657 A * 3/1984 Nobis ..................... F16H 63/04 74/900
6,756,750 B2 * 6/2004 Wakitani ............. B60L 15/2009 318/55
7,648,001 B2 * 1/2010 Yanagihara ........... F16H 59/042 74/473.26
2017/0158044 A1 * 6/2017 Sakai ...................... B60L 50/16
2018/0264928 A1 9/2018 Takaki et al.
(Continued)

FOREIGN PATENT DOCUMENTS

CN 103958260 A * 7/2014 ............. B60L 58/21
JP 2774148 B2 * 7/1998
(Continued)

OTHER PUBLICATIONS

JP-2016160614-A English Translation (Year: 2016).*
(Continued)

*Primary Examiner* — Michael T. Walsh
(74) *Attorney, Agent, or Firm* — The Webb Law Firm

(57) ABSTRACT

An electric work vehicle includes an electric motor, a travel device configured to travel on a ground based on a drive of the electric motor, a transmission configured to transmit a motive power from the electric motor to the travel device while varying a speed of a rotation inputted from the electric motor, a single operation part configured to accept a manual operation for changing a direction of the rotation of the electric motor and for changing a shift level of the transmission, and a controller configured to output a control signal to the electric motor and the transmission based on the manual operation accepted by the single operation part.

10 Claims, 5 Drawing Sheets

(56) References Cited

U.S. PATENT DOCUMENTS

| | | | | |
|---|---|---|---|---|
| 2019/0092274 | A1 | 3/2019 | Nakaji et al. | |
| 2020/0101972 | A1* | 4/2020 | Lee | B60L 15/2063 |
| 2020/0290556 | A1 | 9/2020 | Nakaji et al. | |

FOREIGN PATENT DOCUMENTS

| | | | | |
|---|---|---|---|---|
| JP | H11165551 | A | * | 6/1999 |
| JP | 2004011713 | A | * | 1/2004 |
| JP | 2007137323 | A | * | 6/2007 |
| JP | 2015149876 | A | | 8/2015 |
| JP | 2016160614 | A | * | 9/2016 |
| JP | 6338876 | B2 | * | 6/2018 |
| JP | 2018165075 | A | * | 10/2018 |
| JP | 2018162017 | A | | 12/2018 |
| JP | 201960426 | A | | 4/2019 |

OTHER PUBLICATIONS

JP-2007137323-A English Translation (Year: 2007).*
JP-2018165075-A English Translation (Year: 2018).*
CN-103958260-A English Translation (Year: 2014).*
JP-6338876-B2 English Translation (Year: 2018).*
JP-2004011713-A English Translation (Year: 2004).*
JP-2774148-B2 English Translation (Year: 1998).*
JP-H11165551-A English Translation (Year: 1999).*
Office Action in JP 2022-181172 issued Dec. 8, 2025.
Decision of Refusal issued in parent Japanese Application No. 2022-181172 issued Feb. 18, 2026.
Decision of Dismissal of Amendment issued in parent Japanese Application No. 2022-181172 issued Feb. 18, 2026.

* cited by examiner

ELECTRIC WORK VEHICLE

CROSS REFERENCE TO RELATED APPLICATION

This application claims priority to Japanese Patent Application No. 2022-181172 filed Nov. 11, 2022, the disclosure of which is hereby incorporated by reference in its entirety.

BACKGROUND OF THE INVENTION

Field of the Invention

The present invention relates to an electric work vehicle.

Description of Related Art

In such a conventional work vehicle disclosed in Japanese Patent Publication JP2019-060426A as an example, an operator changes a shift level of a transmission while operating an operation tool as a means of varying a speed of a motive power inputted from an engine. In the conventional work vehicles, the operator can change not only the shift level but also a direction of travel to either a front direction or a reverse direction by operating the operation tool. In recent years, an electric motor has been increasingly employed in the work vehicle as a driving source instead of an engine. The electric motor is able to rotate in both a forward direction and a reverse direction. On the other hand, the conventional operation tool is merely configured to operate the transmission. That is, in a case that the conventional operation tool is employed in a work vehicle driven by the electric motor, an additional operation tool is necessary for changing the direction of a rotation of the electric motor. The present invention provides an electric work vehicle which simplifies an operation for changing the direction of the rotation of the electric motor.

SUMMARY OF THE INVENTION

An electric work vehicle including:

a rotationally drivable electric motor;

a travel device configured to travel on a ground based on a drive of the electric motor;

a transmission configured to transmit a motive power from the electric motor to the travel device while varying a speed of a rotation inputted from the electric motor;

a single operation part configured to accept a manual operation for changing a direction of the rotation of the electric motor and for changing a shift level of the transmission; and a controller configured to output a control signal to the electric motor and the transmission based on the manual operation accepted by the single operation part.

According to this configuration, an operator can change not only the shift level of the transmission but also the direction of the rotation of the electric motor by operating the single operation part. That is, the operator can switch a travel direction of the electric work vehicle between a forward travel and a reverse travel without an additional operation tool for changing the direction of the rotation of the electric motor. Therefore, an operation for changing the direction of the rotation of the electric motor is simplified in the electric work vehicle.

In one preferred embodiment of the electric work vehicle of the present invention, the single operation part includes a single lever movable in front, back, left and right directions, and the controller is configured to change the direction of the rotation of the electric motor in response to the single lever operated in a left-right direction and to change the shift level of the transmission in response to the single lever operated in a front-back direction.

According to this configuration, the operator can change the shift level by operating the lever in the front-back direction and can switch the travel direction of the electric work vehicle between the forward travel and the reverse travel by operating the lever in the left-right direction. This enables the operator to operate the lever intuitively.

In one preferred embodiment of the electric work vehicle of the present invention, the single operation part includes:

a first hole configured to guide the single lever in the front-back direction during the manual operation of the single lever; and a second hole configured to guide the single lever in the left-right direction during the manual operation of the single lever, and the first hole and the second hole intersect with each other.

According to this configuration, the lever moves along the first hole when the operator operates the lever in the front-back direction. In addition, the lever moves along the second hole when the operator operates the lever in the left-right direction. This enables the operator to operate the lever in respective front, back, left and right directions certainly. That is, this configuration can avoid a risk of unintentional switching between the forward travel and the reverse travel and a risk of unintentional change of the shift level, which would otherwise be caused by slipping operator's hand.

In one preferred embodiment of the electric work vehicle of the present invention, the first hole and the second hole intersect with each other at a neutral position of the single lever, and the controller is configured to:

transmit no motive power to the travel device in a case of the single lever positioned at the neutral position;

control the electric motor to rotate in the direction which moves the travel device forward in a case of the single lever operated forward or backward along the first hole from the neutral position; and control the electric motor to rotate in the direction which moves the travel device backward in a case of the single lever operated leftward or rightward not along the first hole from the neutral position.

This configuration enables the operator to cause the electric work vehicle traveling forward by operating the lever forward or backward from the neutral position and to cause the electric work vehicle traveling backward by operating the lever leftward or rightward from the neutral position. The electric work vehicle stops in a case of the lever positioned at the neutral position. That is, the operator can cause the electric work vehicle traveling forward or backward by operating the lever forward, backward, leftward and rightward from the neutral position as a start point.

In one preferred embodiment of the electric work vehicle of the present invention, the single operation part is provided with a biasing mechanism which biases the single lever to the neutral position.

According to this configuration, the lever is returned to the neutral position by the biasing mechanism when the operator is putting the lever back to the neutral position. Therefore, in comparison with a configuration without the biasing mechanism, the operator does not need to adjust a position of the lever when the operator is putting the lever back to the neutral position, thus relieving a burden of the operator.

In one preferred embodiment of the electric work vehicle of the present invention, the second hole intersects with a longitudinal intermediate portion of the first hole.

This configuration switches the travel direction of the electric work vehicle from the forward travel to the reverse travel when the operator operates the lever leftward or rightward from the longitudinal intermediate portion of the first hole. This enables the operator to operate the lever intuitively.

In one preferred embodiment of the electric work vehicle of the present invention, the second hole intersects with the first hole with a first end portion thereof.

This configuration allows the lever to move, along the second hole, to only one side, the left side or the right side, of the of the first hole. This switches the travel direction of the electric work vehicle from the forward travel to the reverse travel when the operator operates the lever leftward or rightward along the second hole from the first hole. This enables the operator to operate the lever intuitively.

In one preferred embodiment of the electric work vehicle of the present invention, the single operation part includes a third hole which intersects with a second end portion of the second hole and configured to guide the single lever in the front-back direction during the manual operation of the single lever, the second end portion being an opposite end of the first end portion.

According to this configuration, the lever is guided to the third hole when the operator operates the lever leftward or rightward from the first hole. Furthermore, the shift level in a case of the work vehicle traveling backward is changed when the operator operates the lever in the front-back direction along the third hole. That is, first, the travel direction of the electric work vehicle is switched from the forward travel to the reverse travel when the operator operates the lever in the left-right direction along the second hole, and then, the shift level is changed when the operator operates the lever in the front-back direction. This enables the operator to operate the lever intuitively.

The above and other elements, features, steps, characteristics and advantages of the present invention will become more apparent from the following detailed description of the preferred embodiments with reference to the attached drawings.

DESCRIPTION OF THE INVENTION

Throughout embodiments, unless otherwise noted, "front" is defined as a front side corresponding to a front-back direction (traveling direction) relative to a body of the electric work vehicle, "back" is defined as a back side corresponding to the front-back direction relative to the body of the electric work vehicle, a left-right direction or a lateral direction is defined as a traversing direction (width direction) perpendicular to the front-back direction relative to the body of the electric work vehicle, "top" and "bottom" refer to positional relationship based on a ground height in a vertical direction relative to the body of the electric work vehicle.

Figure 1:
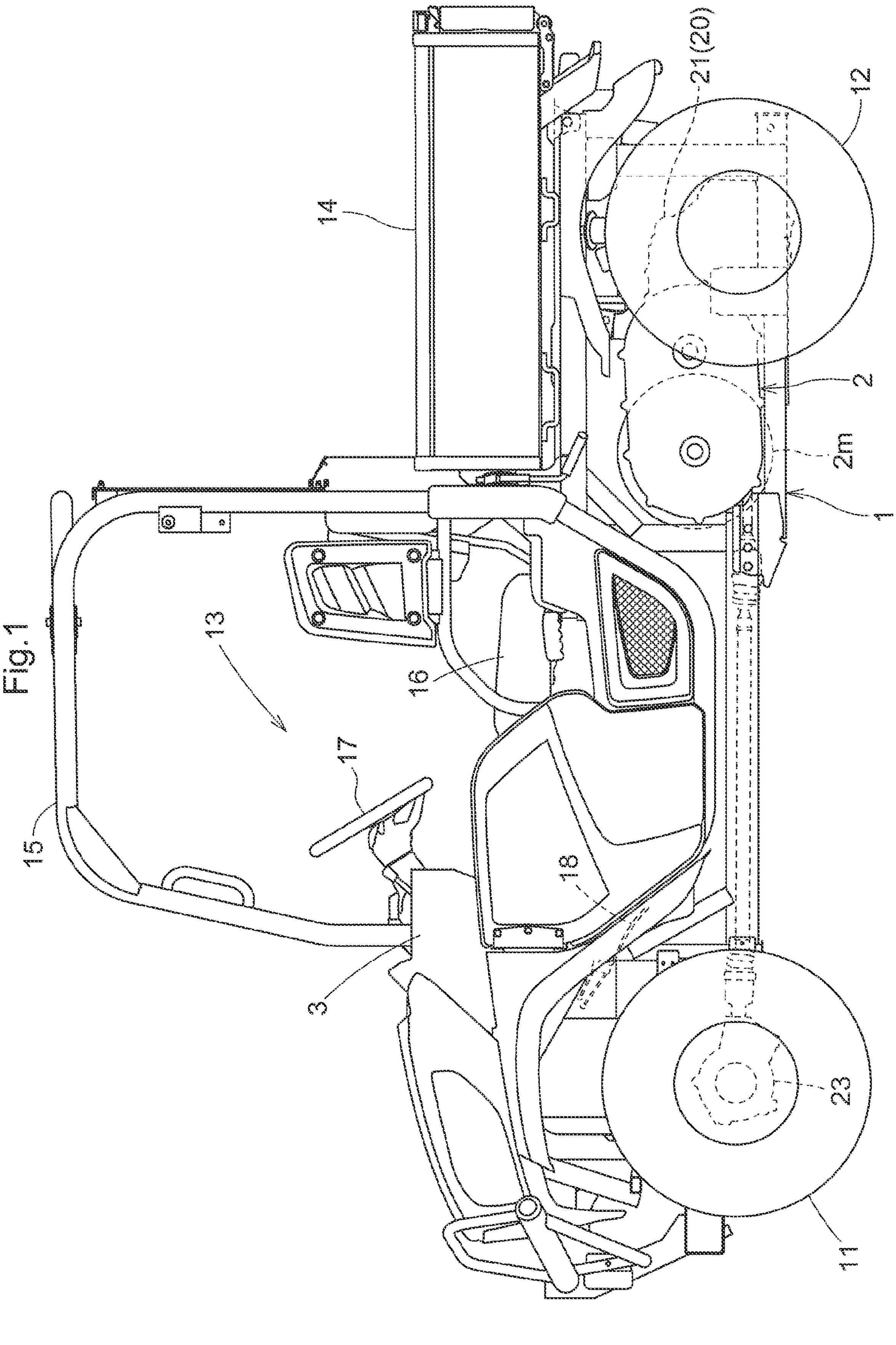
FIG. 1 is a side view of a utility vehicle.
Figure 2:
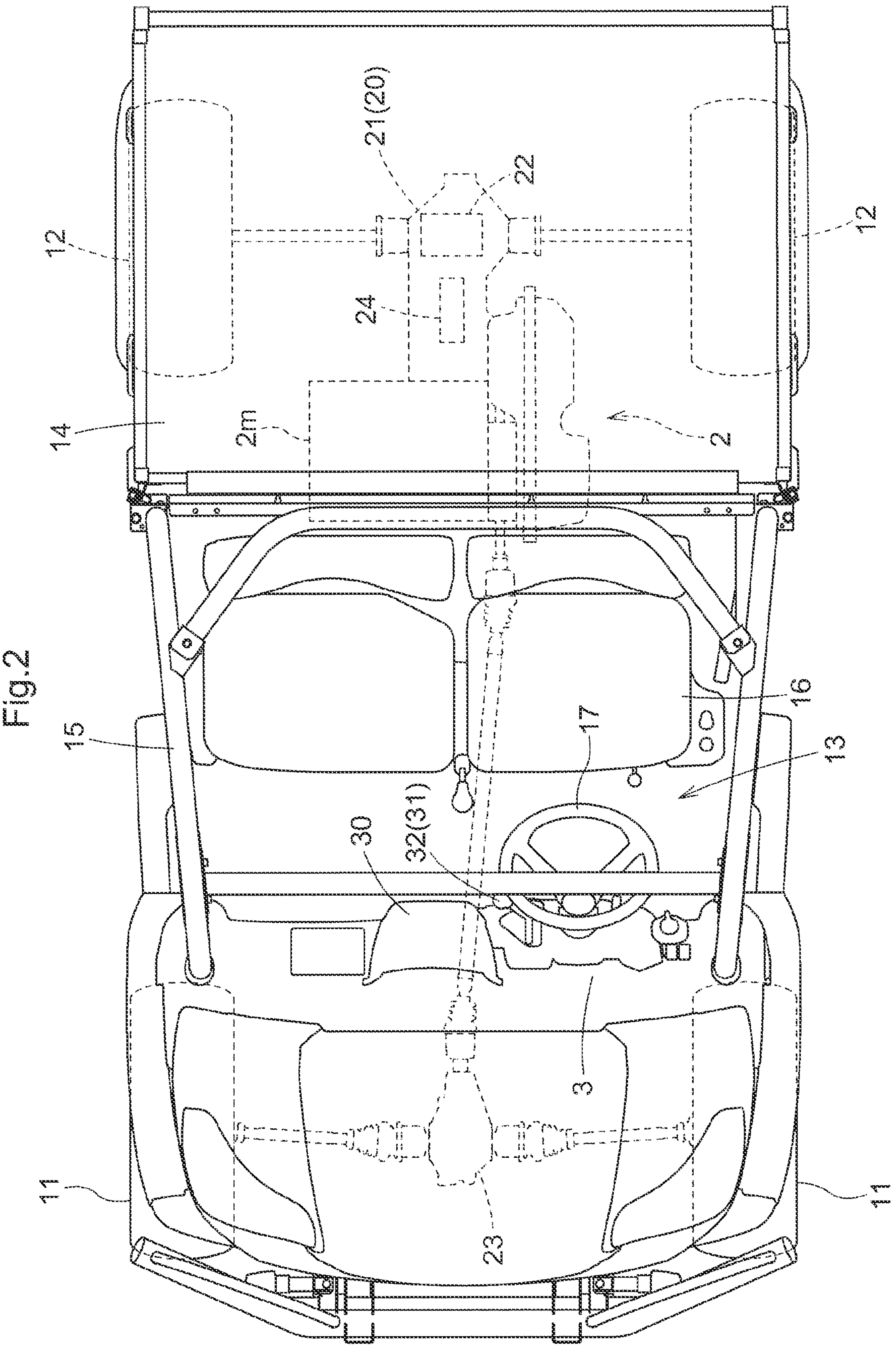
FIG. 2 is a plan view of the utility vehicle.
Figure 3:
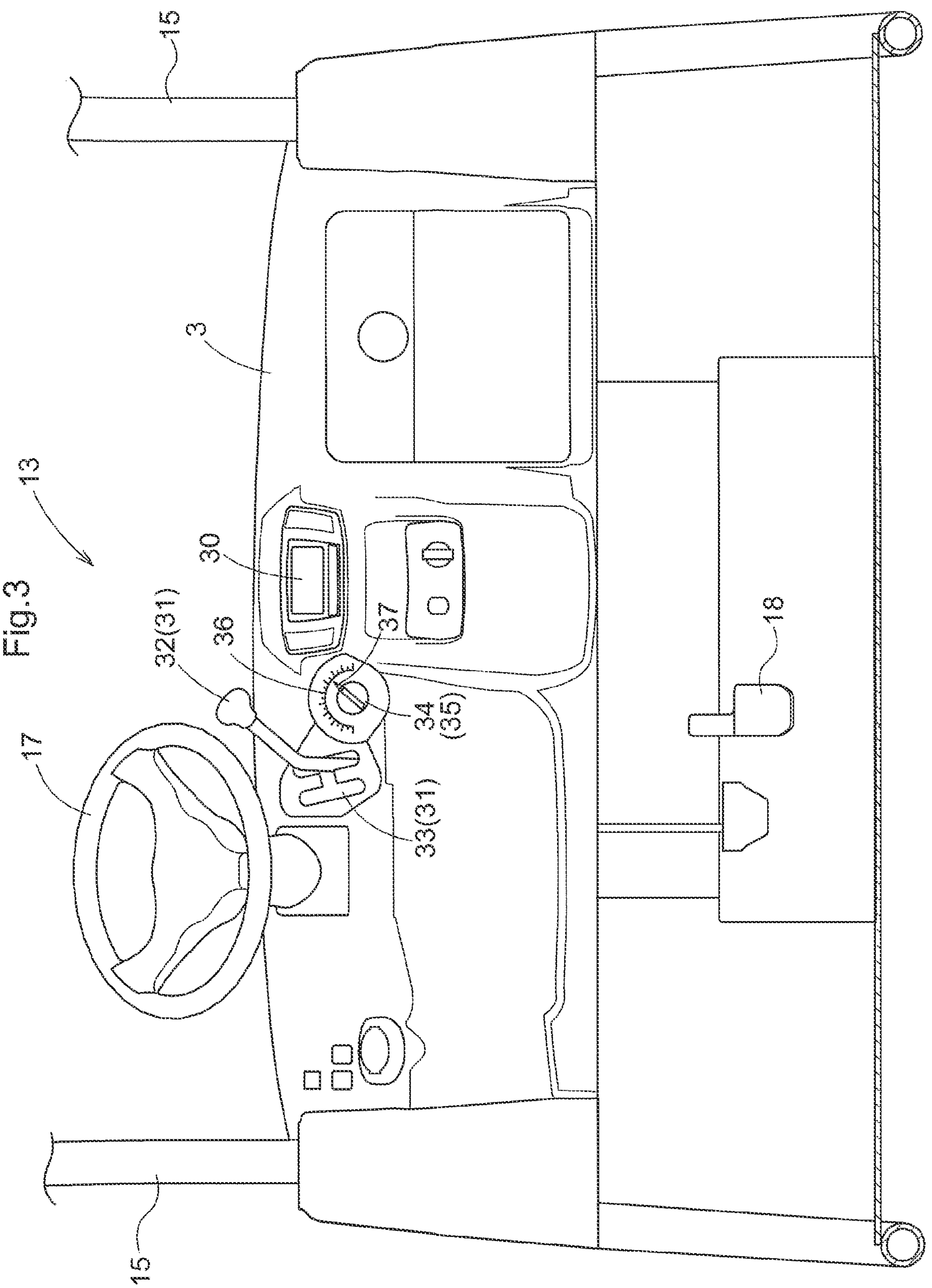
FIG. 3 is a schematic diagram of an operation panel and therearound in a driver's section.

Modes for carrying out the present invention will be described with reference to the drawings showing a utility vehicle as an example of an electric work vehicle. An example of the utility vehicle shown in FIGS. 1 and 2 is utilizable for such multiple purposes as luggage-carrying, recreation, and the like. The electric work vehicle of the present invention includes an all-terrain vehicle (ATV), buggy, off-road vehicle, agricultural work vehicle, construction work vehicle, and the like.

The illustrated utility vehicle includes a pair of left and right drivable and steerable front wheels 11 and a pair of left and right drivable rear wheels 12. A travel body 1 is able to travel by the pair of front wheels 11 and the pair of rear wheels 12. The travel body 1 includes a driver's section 13 in a center portion thereof which driver's section 13 an operator boards to perform an operation. The travel body 1 includes a loading platform 14 in a rear portion thereof on which luggage is loadable. The travel body 1 is mounted with a motive power unit 2 located in an area below the loading platform 14. The motive power unit 2 includes a rotationally drivable electric motor **2*m*** as a chief element.

The travel body 1 is mounted with a powertrain device 20. The powertrain device 20 transmits a motive power inputted from the motive power unit 2 to the pair of front wheels 11 and the pair of rear wheels 12. In this way, the pair of front wheels 11 and the pair of rear wheels 12 move on a ground based on a rotational drive of the electric motor **2*m*. The pair of front wheels 11 and the pair of rear wheels 12** correspond to a "travel device" recited in the claims.

The driver's section 13 is surrounded and protected by a ROPs frame 15 in a boxed shape. The driver's section 13 includes a driver's seat 16 on which an operator sits. In front of the driver's seat 16, the driver's section 13 includes a front panel 3 in which various operation tools and display devices are assembled, and a steering handle 17 for steering the pair of front wheels 11. The driver's section 13 includes an acceleration pedal 18 in a floor area thereof below the steering handle 17.

The powertrain device 20 to which the motive power from the motive power unit 2 is input includes a gear transmission mechanism 21, a rear wheel differential mechanism 22, a front wheel differential mechanism 23, and the like. The gear transmission mechanism 21 in this embodiment includes a transmission 24. The transmission 24 is configured to switch a shift level between a high-speed stage and a low-speed stage by a high-low shift clutch. That is, the transmission 24 is configured to transmit the motive power from the electric motor **2*m* to the pair of front wheels 11 and the pair of rear wheels 12 (i.e., the travel device) while varying the speed of the rotation inputted from the electric motor 2*m***.

To the front panel 3, there are assembled: a meter panel 30 which has a liquid-crystal display (LCD) and light-emitting diode (LED) lamp; a single shift operation part 31; a speed limit operation tool 34; and the like. The shift operation part 31 accepts a manual operation for changing the shift level of the transmission 24. The shift operation part 31 includes a single shift lever 32, a shift gate 33. The shift operation part 31 is provided with a biasing mechanism 32*a*. Alternatively, the shift operation part 31 may include the biasing mechanism 32*a*. The shift gate 33 is formed in a H-shape in the front panel 3. The shift lever 32 is movable along the shift gate 33 with the H-shape. The shift lever 32 is operable in front, back, left and right directions. The biasing mechanism 32*a* biases the shift lever 32 to a neutral position described later. The biasing mechanism 32*a* may be a plate spring, a coil spring, a torsion spring or a rubber. The biasing mechanism 32*a* may also be a composite containing at least one of the spring and the rubber. The shift operation part 31 corresponds to a "single operation tool" recited in claims. The shift lever 32 corresponds to a "single lever" recited in claims.

The speed limit operation tool 34 sets an upper limit of a vehicle speed. The speed limit operation tool 34 is a circular dial tool. An arc-shaped upper speed limit indicator 36 is provided around the speed limit operation tool 34. The upper speed limit indicator 36 has an arc-shaped scale indicative of the vehicle speed. The upper speed limit indicator 36 is provided with a pointer 37 which is disposed below the arc-shaped scale and mechanically linked to the speed limit operation tool 34.

Configuration Related to Motor Control

Figure 4:
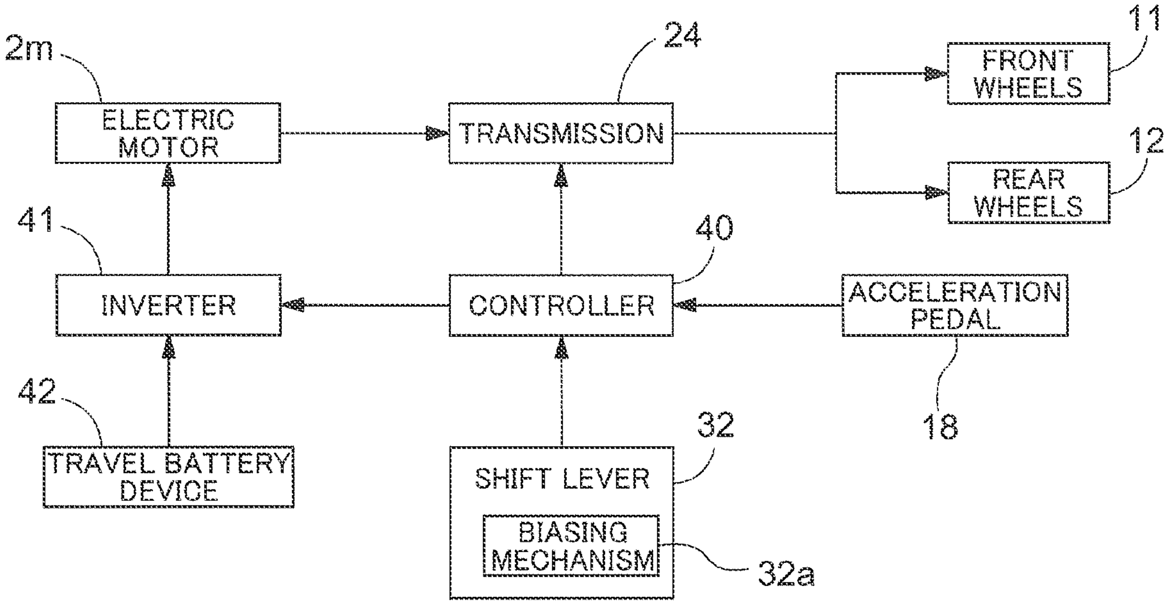
FIG. 4 is a block diagram indicative of a configuration of a control of an electric work vehicle.

As shown in FIG. 4, a control configuration for the electric motor 2*m* is provided with a controller 40 and an inverter 41. The controller 40 is a chief element of the electric work vehicle and is composed of a collection of multiple electronic control units (ECUs). The controller 40 is configured to control the drive of the electric motor 2*m* and the shift level of the transmission 24. The controller 40 connects with the shift lever 32 and the acceleration pedal 18.

A travel battery device 42 is, for example, a lithium-ion battery. Not shown in diagrams, the travel battery device 42 is composed of a plurality of small low-voltage unit batteries (cells) stacked together. The travel battery device 42 outputs a voltage of, for example, 250 volts. The unit batteries (cells) are housed in a sealed storage case of the travel battery device 42.

The controller 40 connects with the inverter 41 via a harness (not shown) for signals. The controller 40 outputs a control signal to the inverter 41 in response to an operation of the acceleration pedal 18. In response to the control signal by the controller 40, the inverter 41 adjusts an electric power (voltage, frequency and current) to be supplied to the electric motor 2*m* from the travel battery device 42 and controls an output of the electric motor 2*m*.

The controller 40 connects with the transmission 24 via a harness (not shown) for signals. The controller 40 outputs a control signal to the transmission 24 in response to an operation of the shift lever 32. The transmission 24 sets the shift level to either the high-speed stage or the low-speed stage in response to the control signal by the controller 40.

In this embodiment, the shift lever 32 functions as a forward/reverse switching lever which switches a travel direction of the electric work vehicle between a forward travel and a reverse travel. The shift gate 33 has a forward operation hole 33F for a forward operation, a reverse operation hole 33R for a reverse operation, and an intermediate hole 33M. The forward operation hole 33F and the reverse operation hole 33R are arranged side by side, and configured to guide the shift lever 32 in the front-back direction during the operation of the shift lever 32. The intermediate hole 33M is located between the forward operation hole 33F and the reverse operation hole 33R, and communicates with each of the forward operation hole 33F and the reverse operation hole 33R.

That is, the intermediate hole 33M intersects with each of the forward operation hole 33F and the reverse operation hole 33R. The intermediate hole 33M is configured to guide the shift lever 32 in the left-right direction during the operation of the shift lever 32. A right end portion (first end portion) of the intermediate hole 33M connects with the forward operation hole 33F. The reverse operation hole 33R intersects with a left end portion (second end portion), which is an opposite end portion of the right end portion, of the intermediate hole 33M and is configured to guide the shift lever 32 in the front-back direction during the operation of the shift lever 32. The forward operation hole 33F corresponds to a "first hole" recited in claims. The intermediate hole 33M corresponds to a "second hole" recited in claims. The reverse operation hole 33R corresponds to a "third hole" recited in claims.

The both ends of the forward operation hole 33F are respectively defined as a low-speed forward travel position 33*a* and a high-speed forward travel position 33*b*. The both ends of the reverse operation hole 33R are respectively defined as a low-speed reverse travel position 33*c* and a high-speed reverse travel position 33*d*. A middle position between the low-speed forward travel position 33*a* and the high-speed forward travel position 33*b* is a neutral position 33*e*. A middle position between the low-speed reverse travel position 33*c* and the high-speed reverse travel position 33*d* is a neutral position 33*f*. Both neutral positions 33*e*, 33*f* are connected by the intermediate hole 33M. In other words, the intermediate hole 33M intersects with the longitudinal intermediate portion of the forward operation hole 33F and the longitudinal intermediate portion of the reverse operation hole 33R.

In this embodiment, as shown in FIG. 4 the shift operation part 31 is provided with the biasing mechanism 32*a*. Alternatively, the shift operation part 31 may include the biasing mechanism 32*a*. FIGS. 5 to 8 shows a hatched line indicative of a biasing range BR in which an elasticity of the biasing mechanism 32*a* affects on the shift lever 32. The area of the biasing range BR spans an area of the intermediate hole 33M and longitudinal intermediate areas of both the forward operation hole 33F and the reverse operation hole 33R. In a case that the operator does not operate the shift lever 32 and that the shift lever 32 is positioned within the biasing range BR, the shift lever 32 is returned to the neutral position 33*e* by the elasticity of the biasing mechanism 32*a*. In other words, the position at which the forward operation hole 33F and the intermediate hole 33M intersect with each other is the neutral position 33*e* of the shift lever 32. When the operator operates the shift lever 32 from the neutral position 33*e*, the operation is against the elasticity of the biasing mechanism 32*a*, to the low-speed forward travel position 33*a*, the high-speed forward travel position 33*b*, the low-speed reverse travel position 33*c*, or the high-speed reverse travel position 33*d*.

In a case of the shift lever 32 positioned at the neutral position 33*e* or the neutral position 33*f*, the controller 40 prevents the electric motor 2*m* from driving even when the acceleration pedal 18 is operated. In this case, the inverter 41 supplies no electric power to the electric motor 2*m*. That is, the controller 40 is configured to transmit no motive power to the pair of front wheels 11 and the pair of rear wheels 12 (i.e., the travel device) in a case of the shift lever 32 positioned at the neutral positions 33*e*, 33*f*.

In a case of the shift lever 32 positioned at the low-speed forward travel position 33*a* or the high-speed forward travel position 33*b*, the controller 40 outputs to the inverter 41 the control signal for a forward rotation of the electric motor 2*m*, in response to the operation of the acceleration pedal 18. The inverter 41 controls the electric motor 2*m* to rotate the electric motor 2*m* in a forward direction in response to the control signal by the controller 40. That is, the controller 40 is configured to control the electric motor 2*m* to rotate in the direction which makes the pair of front wheels 11 and the pair of rear wheels 12 (i.e., the travel device) travel forward in a case of the shift lever 32 operated forward or backward along the forward operation hole 33F from the neutral position 33*e*. The controller 40 controls the electric motor 2*m* to rotate in the direction which makes the travel device travel forward in response to the operation of the acceleration pedal 18. Instead of the acceleration pedal 18, a tool for adjusting the speed of the rotation of the electric motor 2*m* may be employed on the electric work vehicle.

In a case of the shift lever 32 positioned at the low-speed reverse travel position 33*c* or the high-speed reverse travel position 33*d*, the controller 40 outputs to the inverter 41 the control signal for a reverse rotation of the electric motor 2*m*, in response to the operation of the acceleration pedal 18. The inverter 41 controls the electric motor 2*m* to rotate the electric motor 2*m* in a reverse direction in response to the control signal by the controller 40. Putting this configuration in other words, the controller 40 is configured to control the electric motor 2*m* to rotate in the direction which makes the pair of front wheels 11 and the pair of rear wheels 12 (i.e., the travel device) travel backward in a case of the shift lever 32 operated leftward along the intermediate hole 33M (not along the forward operation hole 33F) from the neutral position 33*e*. The controller 40 control the electric motor 2*m* to rotate in the direction which makes the travel device travel backward in response to the operation of the acceleration pedal 18.

That is, the controller 40 is configured to change the direction of the rotation of the electric motor 2*m* in response to the shift lever 32 operated in the left-right direction and to change the shift level of the transmission 24 in response to the shift lever 32 operated in the front-back direction. With this configuration in this embodiment, the powertrain device 20 does not have to include a reverse mechanism for switching the travel direction between the forward travel and the reverse travel. In other words, switching of the direction of the rotation of the electric motor 2*m* realizes switching between the forward travel and the reverse travel. In this way, the shift lever 32 is configured to accept the manual operation for changing the direction of the rotation of the electric motor 2*m* and for changing the shift level of the transmission 24. The controller 40 is configured to output the control signal to the electric motor 2*m* and the transmission 24 based on the manual operation accepted by the shift lever 32.

With the above-described configuration in this embodiment, it is possible to switch the direction of the rotation of the electric motor 2*m* and to change the shift level of the transmission 24 by the single shift operation part 31, i.e., by the single shift lever 32.

Other Embodiments

The present invention is not limited to the configuration illustrated in the above embodiment. Other representative embodiments of the invention will be described below.

Figure 5:
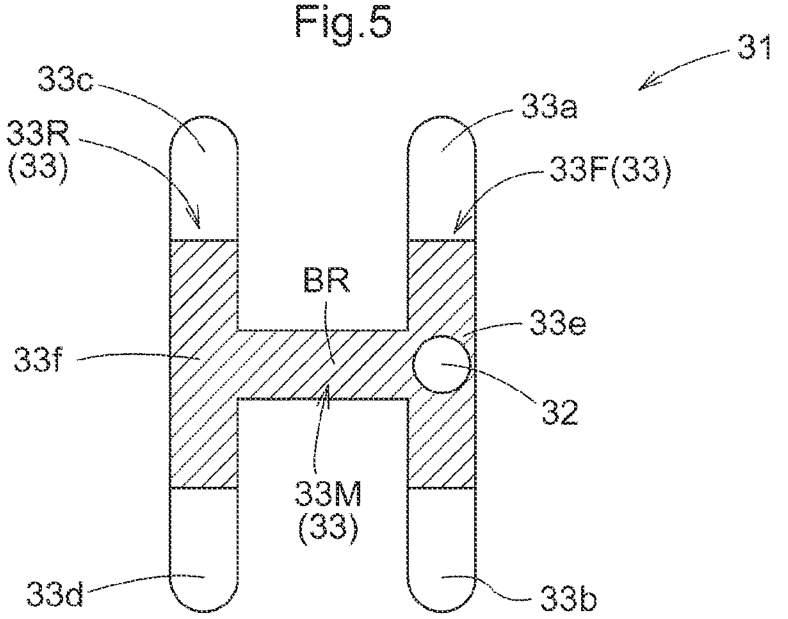
FIG. 5 is a diagram indicative of a shift gate guiding a shift lever in a shift operation tool.

(1) The reverse operation hole 33R shown in FIG. 5 is positioned on the left side of the forward operation hole 33F. Alternatively, the reverse operation hole 33R may be positioned on the right side of the forward operation hole 33F. That is, the controller 40 may be configured to control the electric motor 2*m* to rotate in the direction which makes the pair of front wheels 11 and the pair of rear wheels 12 (i.e., the travel device) travel backward in a case of the shift lever 32 operated on the left or right side of the neutral position 33*e* (not along the forward operation hole 33F).

Figure 6:
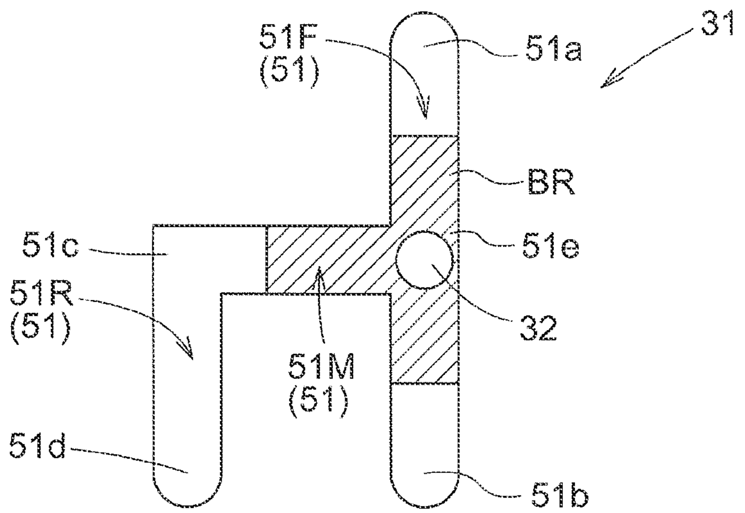
FIG. 6 is a diagram indicative of the shift gate guiding the shift lever in the shift operation tool.

(2) The electric work vehicle may include a shift gate 51 shown in FIG. 6 instead of the shift gate 33 shown in FIG. 5. In FIG. 6 as an example, a forward operation hole 51F (first hole) and a reverse operation hole 51R (third hole) each extend in the front-back direction. Front and back end portions of the forward operation hole 51F are respectively defined as a low-speed forward travel position 51*a* and a high-speed forward travel position 51*b*. Front and back end portions of the reverse operation hole 51R are respectively defined as a low-speed reverse travel position 51*c* and a high-speed reverse travel position 51*d*. The low-speed reverse travel position 51*c* is positioned in an upside of the high-speed reverse travel position 51*d* from the paper perspective in FIG. 6. A middle position between the low-speed forward travel position 51*a* and the high-speed forward travel position 51*b* is a neutral position 51*e*. An intermediate hole 51M (second hole) is located between the neutral position 51*e* and the low-speed reverse travel position 51*c*, and communicates with each of the forward operation hole 51F and the reverse operation hole 51R. Predetermined upper and lower areas relative to the neutral position 51*e* in the forward operation hole 51F and a predetermined area to left of the neutral position 51*e* in the intermediate hole 51M form a biasing range BR of the biasing mechanism 32*a*. Although the reverse operation hole 51R is positioned on a left side of the forward operation hole 51F, the reverse operation hole 51R may be positioned on a right side of the forward operation hole 51F.

Figure 7:
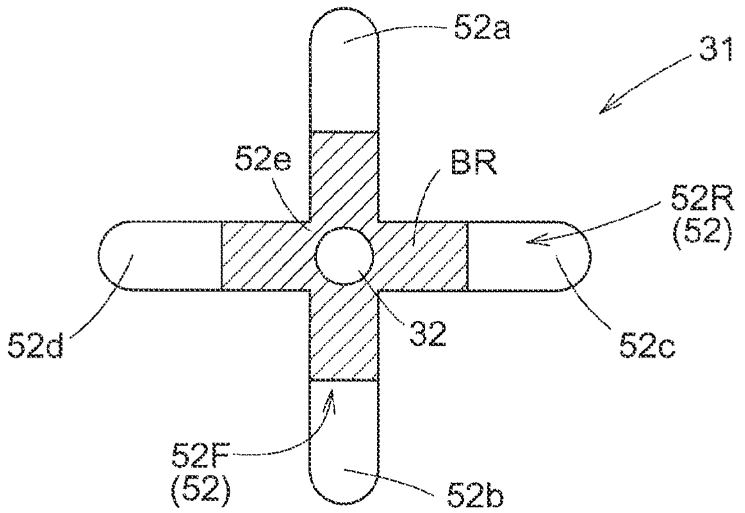
FIG. 7 is a diagram indicative of the shift gate guiding the shift lever in the shift operation tool.

(3) The electric work vehicle may include a shift gate 52 shown in FIG. 7 instead of the shift gate 33 shown in FIG. 5. In FIG. 7 as an example, a forward operation hole 52F (first hole) extends in the front-back direction and a reverse operation hole 52R (second hole) extends in the left-right direction. The forward operation hole 52F and the reverse operation hole 52R intersect with each other in a cross shape. Front and back end portions of the forward operation hole 52F are respectively defined as a low-speed forward travel position 52*a* and a high-speed forward travel position 52*b*. Left and right end portions of the reverse operation hole 51R are respectively defined as a low-speed reverse travel position 52*c* and a high-speed reverse travel position 52*d*. A middle position between the low-speed forward travel position 52*a* and the high-speed forward travel position 52*b* and between the low-speed reverse travel position 52*c* and the high-speed reverse travel position 52*d* is a position where the forward operation hole 52F and the reverse operation hole 52R intersects with each other in the cross shape, i.e., a neutral position 52*e*. Predetermined upper and lower areas relative to the neutral position 52*e* in the forward operation hole 52F and predetermined left and right areas relative to the neutral position 52*e* in the reverse operation hole 52R form a biasing range BR of the biasing mechanism 32*a*.

Figure 8:
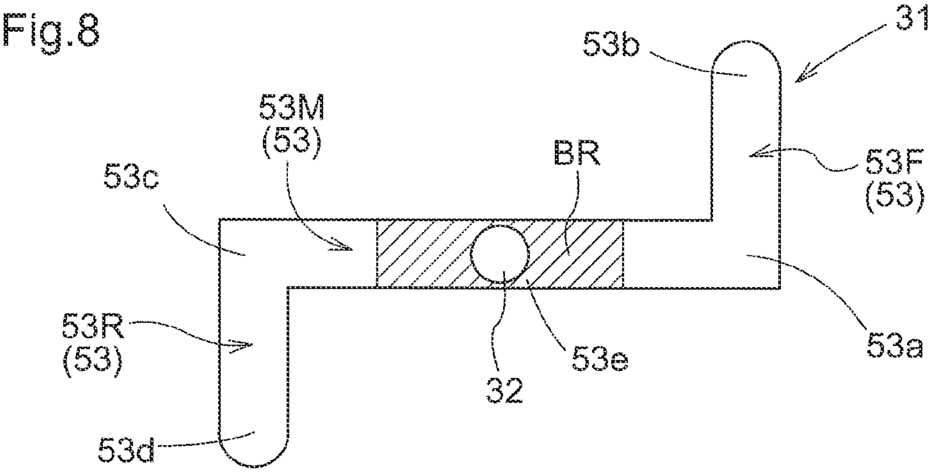
FIG. 8 is a diagram indicative of the shift gate guiding the shift lever in the shift operation tool.

(4) The electric work vehicle may include a shift gate 53 shown in FIG. 8 instead of the shift gate 33 shown in FIG. 5. In FIG. 8 as an example, a forward operation hole 53F (first hole) and a reverse operation hole 53R (third hole) each extend in the front-back direction. Back and front end portions of the forward operation hole 53F are respectively defined as a low-speed forward travel position 53*a* and a high-speed forward travel position 53*b*. The low-speed forward travel position 53*a* is positioned on a downside of the high-speed forward travel position 53*b* from the paper perspective in FIG. 8. Front and back end portions of the reverse operation hole 53R are respectively defined as a low-speed reverse travel position 53*c* and a high-speed reverse travel position 53*d*. The low-speed reverse travel position 53*c* is positioned on an upside of the high-speed reverse travel position 53*d* from the paper perspective in FIG. 8. An intermediate hole 53M (second hole), extending in the left-right direction, is located between the low-speed forward travel position 53*a* and the low-speed reverse travel position 53*c*, and communicates with each of the forward operation hole 53F and the reverse operation hole 53R. A neutral position 53*e* is located at an intermediate area of the intermediate hole 53M in the left-right direction. Predetermined left and right areas relative to the neutral position 53*e* in the intermediate hole 53M form a biasing range BR of the biasing mechanism 32*a*. Although the reverse operation hole 53R is positioned on a left side of the forward operation hole 53F, the reverse operation hole 53R may be positioned on a right side of the forward operation hole 53F.

Note that the configuration disclosed in the above embodiments (including other embodiments; the same applies to the following) may be combined with configurations disclosed in other embodiments, as long as no contradiction arises. The embodiments disclosed herein are illustrative. Embodiments of the present invention are not limited thereto, and can be altered without departing from the object of the present invention.

The present invention is applicable to an electric work vehicle.

What is claimed is:

1. An electric work vehicle comprising:

a rotationally drivable electric motor;

a travel device configured to travel on a ground based on a drive of the electric motor;

a transmission configured to transmit a motive power from the electric motor to the travel device while varying a speed of a rotation inputted from the electric motor;

a single operation part configured to accept a manual operation for changing a direction of the rotation of the electric motor and for changing a shift level of the transmission, the single operation part comprising:

a single lever movable in up, down, left, and right directions; and a substantially H-shaped shift gate, oriented substantially vertically, positioned toward a center of the vehicle relative to a steering handle in a left-right direction and configured to guide movement of the single lever and including a left side and a right side; and a controller configured to output a control signal to the electric motor and the transmission based on the manual operation accepted by the single operation part, wherein the manual operation accepted by the single operation part includes a low-speed forward travel position, a high-speed forward travel position, a low-speed reverse travel position, and a high-speed reverse travel position, wherein the low-speed forward travel position and high-speed forward travel position are positioned on the right side of the H-shaped shift gate, and wherein the low-speed reverse travel position and the high-speed reverse travel position are position on the left side of the H-shaped shift gate.

2. The electric work vehicle according to claim 1, wherein:

the controller is configured to change the direction of the rotation of the electric motor in response to the single lever operated in a left-right direction and to change the shift level of the transmission in response to the single lever operated in a up-down direction.

3. The electric work vehicle according to claim 2, wherein:

the single operation part comprises:

a first hole positioned on the right side of the substantially H-shaped shift gate and configured to guide the single lever in the up-down direction during the manual operation of the single lever; and a second hole configured to guide the single lever in the left-right direction during the manual operation of the single lever, and the first hole and the second hole intersect with each other.

4. The electric work vehicle according to claim 3, wherein:

the first hole and the second hole intersect with each other at a neutral position of the single lever, and the controller is configured to:

transmit no motive power to the travel device in a case of the single lever positioned at the neutral position;

control the electric motor to rotate in the direction which moves the travel device forward in a case of the single lever operated forward or backward along the first hole from the neutral position; and control the electric motor to rotate in the direction which moves the travel device backward in a case of the single lever operated leftward or rightward not along the first hole from the neutral position.

5. The electric work vehicle according to claim 4, wherein:

the single operation part is provided with a biasing mechanism which biases the single lever to the neutral position.

6. The electric work vehicle according to claim 3, wherein:

the second hole intersects with a longitudinal intermediate portion of the first hole in the up-down direction.

7. The electric work vehicle according to claim 3, wherein:

the second hole intersects with the first hole with a first end portion thereof.

8. The electric work vehicle according to claim 7, wherein:

the single operation part comprises a third hole which intersects with a second end portion of the second hole, positioned on the left side of the substantially H-shaped shift gate, and configured to guide the single lever in the up-down direction during the manual operation of the single lever, the second end portion is an opposite end of the first end portion.

9. The electric work vehicle according to claim 8, wherein:

the third hole is configured to guide the single lever frontward and backward from the second end portion;

the low-speed reverse travel position is one of the frontward and backward positions from the second end portion; and the high-speed reverse travel position is the other of the frontward and backward positions from the second end portion.

10. The electric work vehicle according to claim 1, further comprising:

a travel body mounted with:

the travel device including left and right front wheels and left and right rear wheels;

a driver's section in a center portion thereof including a driver's seat on which an operator sits to perform the manual operation;

a loading platform in a rear portion thereof on which a luggage is loadable, and a motive power unit located in an area backward of the driver's seat, frontward of a rear end of the rear wheels, and below the loading platform, the motive power unit including the electric motor and being configured to output a rotational motive power, a powertrain device located in the area and configured to transmit the rotational motive power from the motive power unit to the left and right front wheels and the left and right rear wheels, the powertrain device having the transmission which includes a gear transmission mechanism configured to shift the shift level between a high-speed stage and a low-speed stage.

* * * * *